United States Patent [19]

Hoffman

[11] 4,383,303
[45] May 10, 1983

[54] FREQUENCY SIGNAL CONVERSION APPARATUS AND METHOD

[75] Inventor: John P. Hoffman, Peoria, Ill.
[73] Assignee: Caterpillar Tractor Co., Peoria, Ill.
[21] Appl. No.: 127,996
[22] PCT Filed: Dec. 5, 1979
[86] PCT No.: PCT/US79/01057
    § 371 Date: Dec. 5, 1979
    § 102(e) Date: Dec. 5, 1979
[51] Int. Cl.³ .............................................. G01P 3/48
[52] U.S. Cl. .................................. 364/565; 324/166; 364/484; 377/20; 377/47
[58] Field of Search ....................... 364/484, 485, 565; 235/92 FQ; 324/160, 166, 85; 307/220 R, 225 R

[56] References Cited

U.S. PATENT DOCUMENTS

| 3,836,758 | 9/1974 | Schneider et al. | 235/92 FQ |
| 3,845,396 | 10/1974 | Rutman | 307/220 R |
| 3,882,303 | 5/1975 | Linder | 364/484 |
| 3,930,199 | 12/1975 | Valis | 364/484 |
| 3,963,987 | 6/1976 | Rivere | 324/166 |
| 3,982,199 | 9/1976 | Green | 307/220 R |
| 4,074,196 | 2/1978 | Webster | 324/166 |
| 4,167,699 | 9/1979 | Baker | 364/565 |

FOREIGN PATENT DOCUMENTS 590673  2/1978  U.S.S.R. ............................ 324/166

OTHER PUBLICATIONS

IBM Tech. Discl. Bulletin; vol. 13, No. 4, Sep. 1970; Armonk, N.Y.; Bederman; "Computer and Apparatus for Measuring Rotational Speed"; pp. 1017–1018.

Primary Examiner—Errol A. Krass
Attorney, Agent, or Firm—Martin C. Fliesler

[57] ABSTRACT

A circuit (10) and method for converting a circuit input frequency signal ($f_i$) to a circuit output frequency signal ($f_o$) comprising a phase-locked loop (22) for multiplying the input frequency signal ($f_i$) by a value M to produce a multiple frequency signal ($f_iM$), and a presettable divider for dividing the frequency signal ($f_iM$) by a settable value N to produce the output frequency signal ($f_o$). The circuit (10) and method are used to determine engine speed by converting the signal ($f_i$) to the signal ($f_o$) which can be used with a counter having a one second time base to determine such speed. The conversion occurs in the frequency domain and follows smoothly any change in engine speed.

6 Claims, 1 Drawing Figure

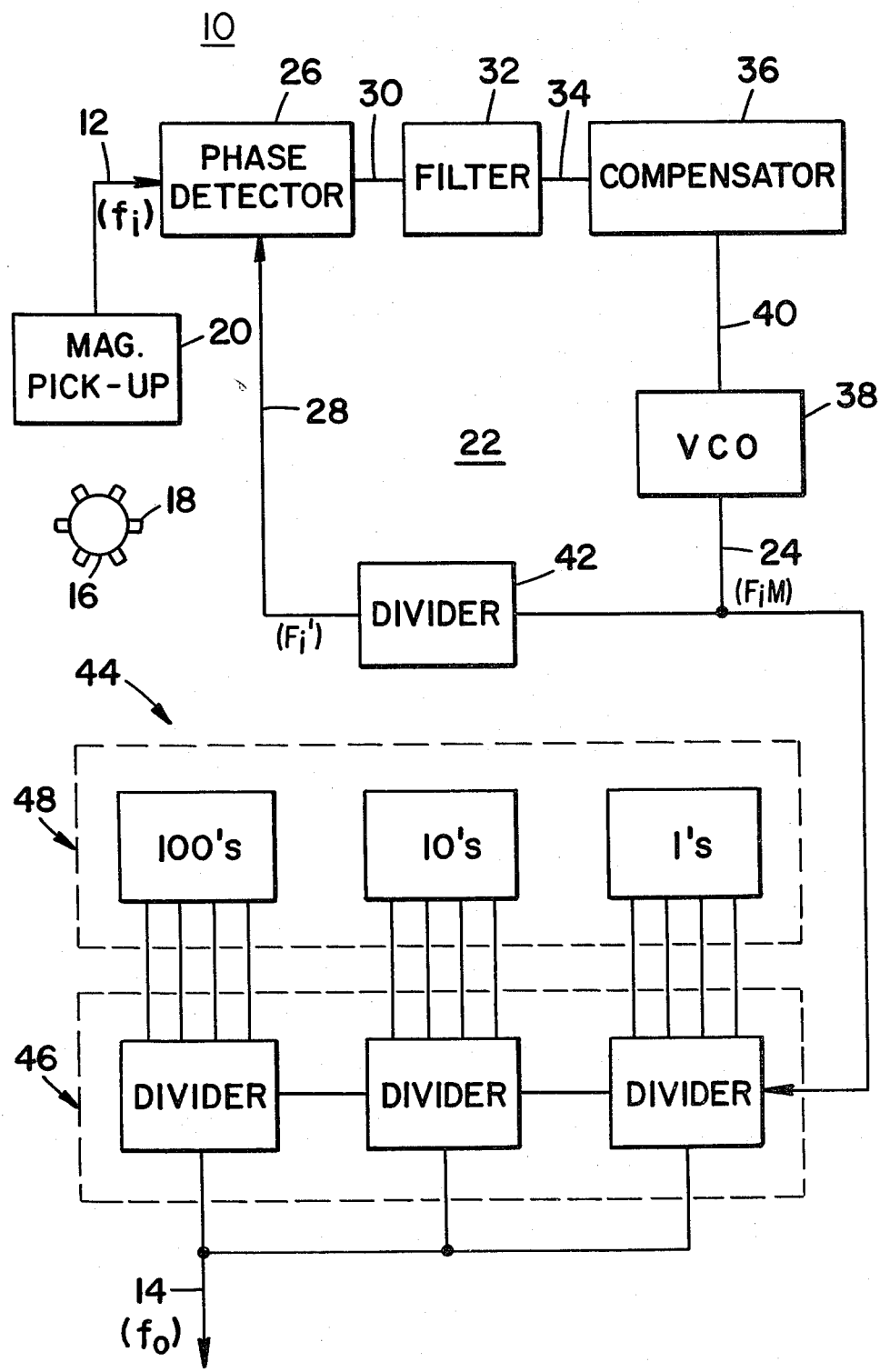

FREQUENCY SIGNAL CONVERSION APPARATUS AND METHOD

DESCRIPTION

1. Technical Field

This invention relates to an apparatus and method for converting one frequency signal to another frequency signal and, more particularly, to a frequency conversion apparatus and method for determining the speed of rotation of a rotating member.

2. Background Art

Digital frequency conversion circuits have a wide variety of applications. For example, one particular use is in converting frequencies to determine the speed of a vehicle engine. Typically, a frequency signal is generated by detecting teeth or other discontinuities on a rotating output shaft of the engine. Unless the shaft has a certain number of teeth, this frequency signal is then converted to another or output frequency signal which is used to measure engine speed.

More specifically, advantageously, the rotating shaft will have such a certain number of teeth, i.e., 60 or a multiple thereof. The frequency signal generated by detecting these teeth can then be counted for one second and this count will then be numerically equal to the RPM of the engine. This procedure is simple due to the wide availability of counters having a time base of one second which can be used to count the pulses of the frequency signal.

However, not uncommonly, the rotating shaft has a number of teeth other than 60 or a multiple thereof. Consequently, the engine speed cannot be determined directly by counting with a counter having a one second time base. Therefore, frequency conversion apparatus are employed in which the frequency signal obtained by detecting the teeth on the shaft is converted to an output signal having a frequency as if the shaft had 60 teeth. The pulses of this output frequency signal can then be counted with a counter having a one second time base to determine the engine speed.

Usually, frequency conversion apparatus for determining the speed of rotation of a rotating member having teeth other than 60 or a multiple thereof will convert signals from the frequency domain to the time domain and back to the frequency domain. For example, in one prior frequency conversion apparatus the frequency signal obtained by sensing teeth on the rotating shaft is used to set a time period during which pulses from a fixed oscillator are counted. This time period can be, for example, the time it takes two consecutive teeth on the rotating member to be sensed.

A disadvantage with the prior frequency conversion apparatus is that it requires a relatively large number of electronic components because of the change between the frequency and time domains. This larger number of components results in an apparatus which is less economical and reliable, and one which requires more electrical power and occupies more space, at least in relation to the present invention.

Also, the prior frequency conversion apparatus can follow fast rates of change in the speed of rotation of the shaft, but not without a disadvantage given below. This is accomplished by the fact that the time period for counting the oscillator pulses changes as the shaft rotation speed changes. For example, as the shaft speed increases, the time period will decrease due to the increased speed at which the two consecutive teeth are sensed. Since pulses from the fixed oscillator are being counted, and since the variation in time periods occurs in a stepwise manner, the converted frequency will be disadvantageously a step function of the input frequency. In other words, the converted frequency will not follow smoothly changes in the input frequency.

Two reasons for not wanting this step function are as follows. In some applications of the frequency conversion circuit, a frequency to DC (F/DC) converter will convert the output frequency of the former to a DC voltage to drive, for example, a chart recorder to provide a trace of the voltage. However, the output voltage of the F/DC converter, and hence the trace, will be a step function when, preferably, it should be smooth since the rotational speed of the shaft may be changing smoothly. Also, it may be desirable to analyze the frequency spectrum of the output frequency signal of the frequency conversion circuit. Spectrum analyzers or Fourier analyzers which perform this function will provide a better analysis if such an output frequency signal changes smoothly, rather than stepwise.

DISCLOSURE OF THE INVENTION

The present invention is directed to overcoming one or more of the problems as set forth above.

In one aspect of the present invention, a circuit is provided for converting an input frequency signal to an output frequency signal, comprising means for multiplying the input frequency signal by a value M to produce a multiple frequency signal, and means for dividing the multiple frequency signal by a value N to produce the output frequency signal.

In another aspect, the present invention includes a method for converting an input frequency signal to an output frequency signal, comprising the steps of multiplying the input frequency signal by a value M to produce a multiple frequency signal, and dividing the multiple frequency signal by a value N to produce the output frequency signal.

With the present invention, frequency conversion is obtained without any conversion to the time domain. Signal processing occurs entirely in the frequency domain. Therefore, fewer electronic components for the circuit are needed than if conversion to the time domain was required. Also, variations in the input frequency signal are followed smoothly, rather than being followed stepwise.

BRIEF DESCRIPTION OF THE DRAWINGS

The single FIGURE is a schematic illustration of an embodiment of the present invention.

BEST MODE OF CARRYING OUT THE INVENTION

The single FIGURE shows a circuit 10 that receives an input frequency signal $f_i$ on a line 12 and generates a converted output frequency signal $f_o$ on a line 14. To generate the input frequency signal $f_i$ on line 12, a rotatable member such as a shaft 16 has a plurality of teeth 18 which can be sensed by a sensor 20. In a conventional manner, the teeth 18 can be magnetic and the sensor 20 can be a magnetic pick-up and pulse shaper. The latter will sense the teeth 18 as they rotate and produce a square wave frequency signal $f_i$ on line 12.

The circuit 10 includes a phase-locked loop 22 which multiplies the frequency signal $f_i$ by a value M and provides the multiple frequency signal on an output line 24.

The phase-locked loop 22 includes a phase detector or comparator 26 having one input receiving the frequency signal $f_i$ on line 12. The phase detector 26 compares this input frequency signal $f_i$ with a frequency signal $f_i$ on a line 28 and generates an error signal on a line 30 which is proportional to the difference in phase between the signals on line 12 and line 28. A low pass filter 32 filters the error signal on line 30 and feeds the filtered signal over a line 34 to a compensator 36 for well-known phase-locked loop purposes. The signal from compensator 36 is then fed to a voltage controlled oscillator (VCO) 38 over a line 40. The VCO 38 thereby has its output frequency signal on line 24 controlled by the filtered and compensated error signal on line 40. A divider 42 divides the frequency signal on line 24 to provide the frequency signal on line 28.

As is conventionally know for phase-locked loops, by placing the divider 42 between the VCO 38 and the phase detector 26, the output frequency signal of the VCO 38 on line 24 will be a multiple M which is the division factor of the divider 42. For example, if divider 42 is set to divide by 60, then the factor M will be 60, whereby the signal on line 24 is 60 times the frequency signal $f_i$ on line 12.

The circuit 10 also includes a divider network 44 which functions to divide the frequency signal on line 24 by a value N. Network 44 includes a divider shown generally at 46 which receives the frequency signal on line 24 and provides the circuit output frequency $f_o$ on the line 14. The value N can be programmed or preset by a thumbwheel switch shown generally at 48. In the example shown, thumbwheel switch 48 has a 1's digit wheel, a 10's digit wheel, and a 100's digit wheel setting so that divider 46 can be set to divide by N for values from 1 to 999. Divider 46 constitutes three counters conventionally coupled as shown.

Mathematically, the circuit 10 can be described by the following equation:

$$f_o = f_i \times M/N$$

where $f_i \times M$ is the frequency of the signal on line 24, M is the divisor of divider 42, N is the divisor set by switch 48 for the divider 44, and M and N are integers.

INDUSTRIAL APPLICABILITY

The present invention can be specifically used to determine the speed of an engine. Assume that the shaft 16 is the output shaft of the engine (not shown) and that the number of teeth 18 is 8. This value 8 is the integer N so that thumbwheel switch 48 is set to cause divider 46 to divide by 8. Also, assume that the divider 42 divides by 60, i.e., M=60. As will be seen, this is to convert the signal $f_i$ to the signal $f_o$ having a frequency as if the number of teeth 18 were 60.

As the shaft 16 rotates, the signal $f_i$ will be generated that is proportional to the speed of rotation of the shaft 16 and hence engine speed. The phase-locked loop 22 then generates the frequency signal $f_i \times 60$ on line 24 which is then divided by 8 by the network 44. Thus, the output signal $f_o = f_i \times 60/8$. As can be appreciated, the signal $f_o$ is proportional to the engine speed and this signal $f_o$ can now be fed to, for example, a counter having a one second time base to determine engine speed.

Circuit 10 is a relatively simple circuit having only a phase-locked loop 22 and a divider network 44, each having a relatively small number of components. The signals processed by the circuit 10 are always in the frequency domain. Furthermore, any change in speed of rotation of the shaft 16 will result in a change in the input frequency $f_i$, which change will be smoothly followed by the output frequency signal $f_o$ on line 14. This is as a result of the phase-locked loop 22 being locked in phase on the variable input frequency $f_i$.

Furthermore, while the signal $f_i$ is shown as first being multiplied and then divided, the reverse process can apply equally. That is, the signal $f_i$ can first be divided by N and then multiplied by M.

Other aspects, objects and advantages of this invention can be obtained from a study of the drawings, disclosure and appended claims.

I claim:
1. Apparatus (10) for determining the speed of rotation of a rotating member (16) having detectable elements (18), comprising:
    (a) means (20) for detecting the elements (18) and generating a first frequency signal ($f_i$) proportional to the speed of rotation of the member (16) in response to detecting said elements (18);
    (b) means (38) for multiplying the first frequency signal ($f_i$) by a value M and producing a second frequency signal ($f_iM$) in response to said multiplication;
    (c) means (42) for dividing the second signal ($f_iM$) by the value M and producing a third frequency signal ($f_io$) in response to said division;
    (d) means (26) for detecting a phase difference between the first signal ($f_i$) and the third signal ($f_io$); and,
    (e) means (44) for dividing the second frequency signal ($f_iM$) by a value N and producing a fourth frequency signal ($f_o$) proportional to the speed of rotation of said member (16), wherein M is proportional to a desired number of detectable elements (18) of said rotating member (16) and N is proportional to the actual number of detectable elements (18) of said member (16).

2. Apparatus (10), as set forth in claim 1, wherein said means (38) for multiplying has a multiplying factor of M=60.)

3. Apparatus (10), as set forth in claim 1, wherein said means (44) for dividing includes:
    (a) a programmable counter (46); and,
    (b) a switch (48) connected to said counter (46) and being constructed to selectively set the value N.

4. A method for determining the speed of rotation of a rotating member (16) having detectable elements (18), comprising:
    (a) detecting the elements (18);
    (b) generating a first frequency signal ($f_i$) proportional to the speed of rotation of the member (16) in response to detecting the elements (18);
    (c) multiplying the first frequency signal ($f_i$) by a value M and producing a second frequency signal ($f_iM$) in response to said multiplication; and
    (d) dividing said second signal ($f_iM$) by the value M and producing a third frequency signal ($f_io$) in response to said division;
    (e) detecting a phase difference between the first signal ($f_i$) and the third signal ($f_io$); and,
    (f) dividing the second frequency signal ($f_iM$) by a value N and producing a fourth frequency signal ($f_o$) proportional to the speed of rotation of the member (16), wherein M is proportional to a desired number of detectable elements (18) of the rotating member (16) and N is proportional to the actual number of detectable elements (18) of the member (16).

5. A method according to claim 4 wherein the step of multiplying includes:

(a) dividing the second frequency signal ($f_iM$) by M to produce a forth frequency signal ($f_i'$); and
(b) locking in phase the first frequency signal ($f_i$) and the fourth frequency signal ($f_i'$).

6. A method according to claim 5 wherein M=60.

* * * * *